(No Model.) 2 Sheets—Sheet 1.
P. DE NAPOLES.
ORE CONCENTRATOR.
No. 486,232. Patented Nov. 15, 1892.
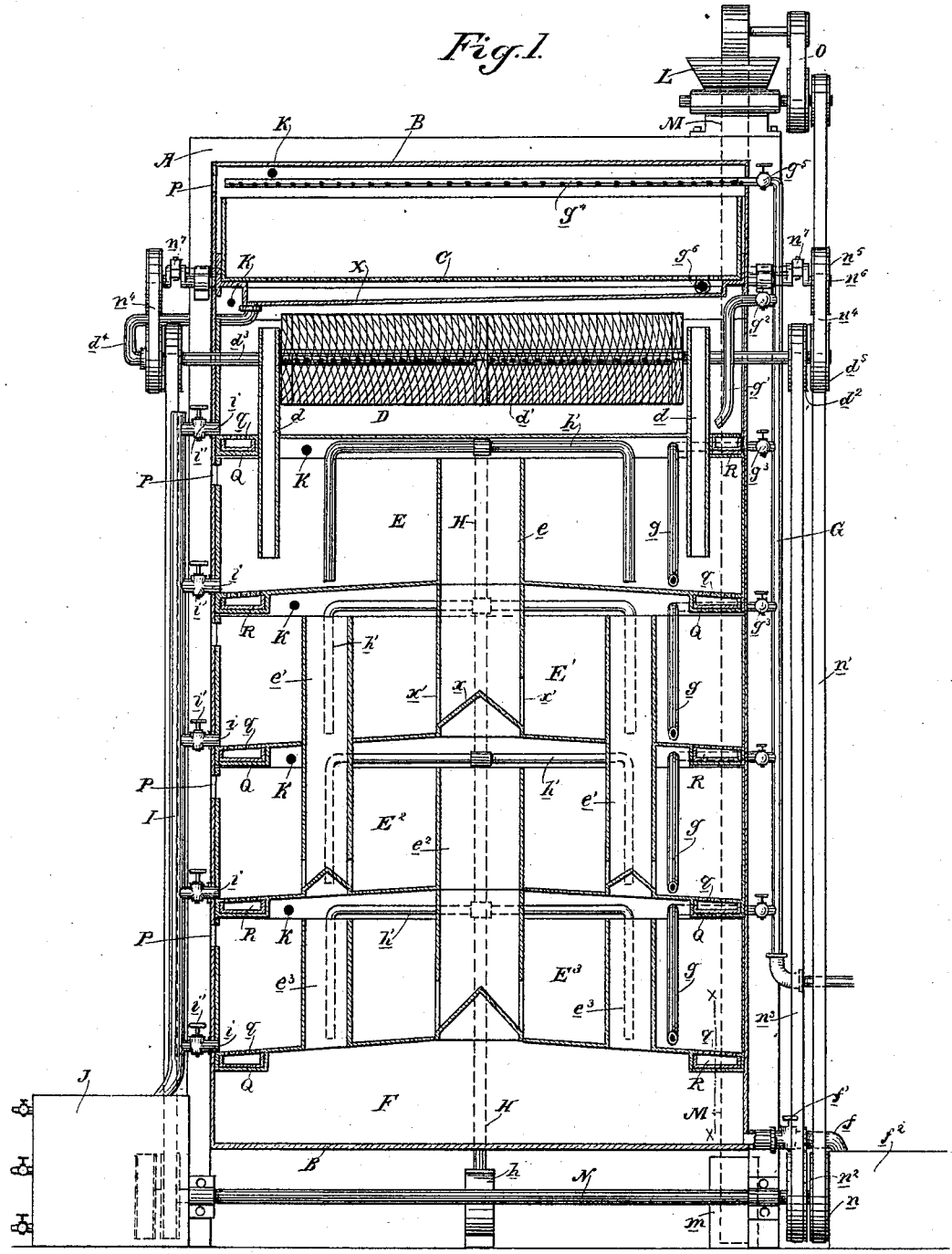
Witnesses:
Inventor,
Pedro de Napoles
By Dewey & Co.
Att'ys
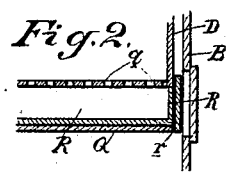

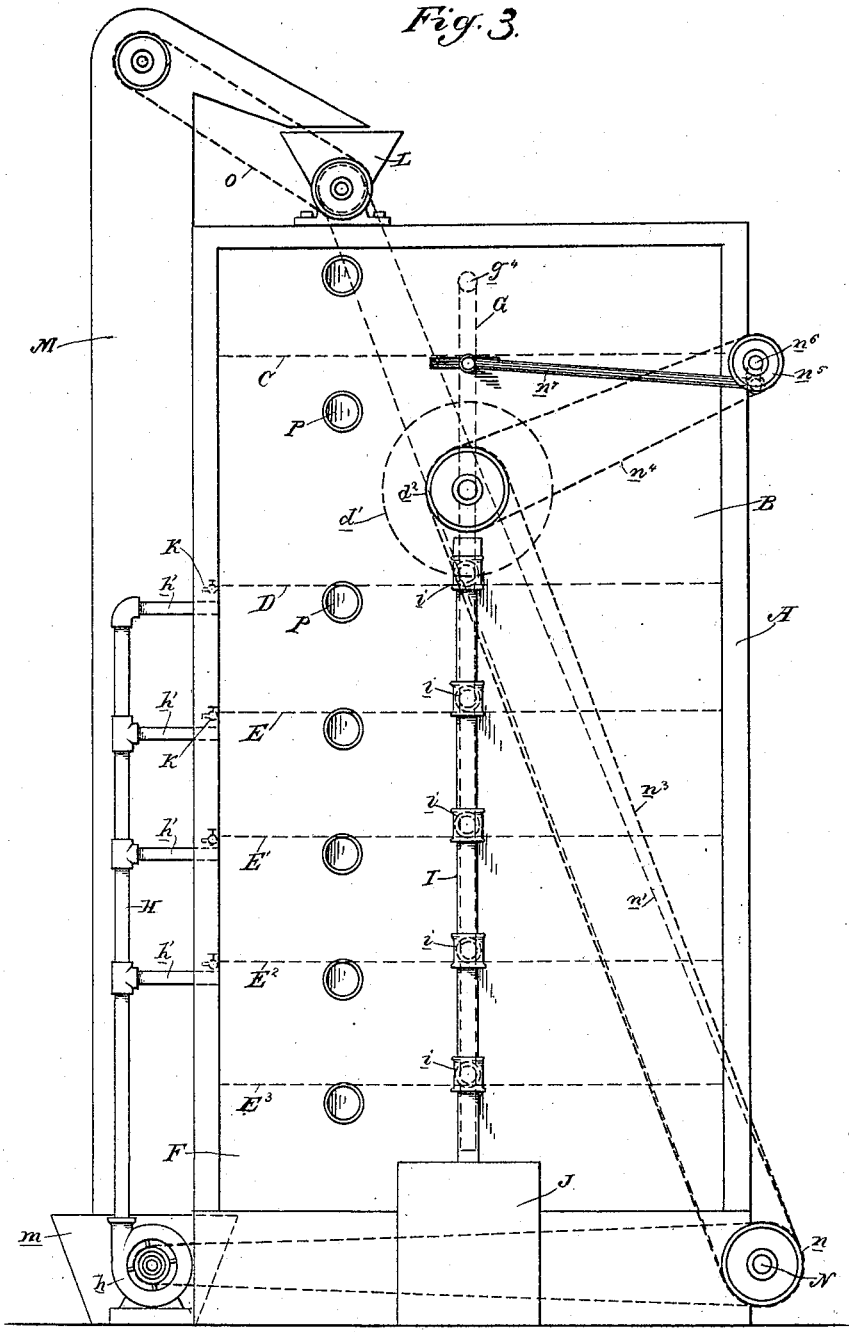

UNITED STATES PATENT OFFICE.

PEDRO DE NAPOLES, OF SAN FRANCISCO, CALIFORNIA.

ORE-CONCENTRATOR.

SPECIFICATION forming part of Letters Patent No. 486,232, dated November 15, 1892.

Application filed January 11, 1892. Serial No. 417,702. (No model.)

*To all whom it may concern:*

Be it known that I, PEDRO DE NAPOLES, a citizen of Portugal, residing in the city and county of San Francisco, State of California, have invented an Improvement in Ore-Concentrators; and I hereby declare the following to be a full, clear, and exact description of the same.

My invention relates to that class of ore-concentrators in which the separation is effected by agitating the material in a body of water, and thereby taking advantage of the different specific gravity of the particles composing the material.

My invention consists in the novel construction, arrangement, and combination of parts hereinafter fully described, and specifically pointed out in the claims.

The object of my invention is to provide a complete and effective ore-concentrating apparatus, the operation of which can be nicely adjusted and regulated to suit the requirements of the particular ore being worked.

Referring to the accompanying drawings for a more complete explanation of my invention, Figure 1 is a vertical section. Fig. 2 is a detail section of one of the drawers R. Fig. 3 is an end view of Fig. 1.

A is a frame.

B is a casing of galvanized iron. In the upper portion of this casing is located a horizontal screen C. Directly under this screen is an inclined pan X, under which is a washing-tank D, under which is a vertical series of pans E, E', E², and E³. Under pan E³ is a receiving-chamber F, having a discharge-pipe $f$, controlled by a cock $f'$ and leading into a waste-tank $f^2$. The washing-tank D communicates with the uppermost pan E by means of overflow-pipes $d$, the upper ends of which are at the level in which the water is intended to remain in the tank. The upper pan E communicates with the next pan E' by a central overflow-pipe $e$, the lower end of which is fitted with an inclined dividing-board $x$ and side apertures $x'$ to discharge the material outwardly into pan E'. This latter pan communicates with the next pan E² by overflow-pipes $e'$, having their lower ends divided and apertured similarly to the lower end of pipe $e$. The pan E² communicates with pan E³ by a central overflow-pipe $e^2$, having a similarly-divided bottom and side apertures. The pan E³ communicates with the receiving-chamber F by overflow-pipes $e^3$. Each of the pans and also the washing-tank are provided with an underlying shell or casing Q, one near each side, and formed or connected with them. In these shells are fitted removable drawers R on the line $x\,x$ of Fig. 1, and the pans and tank communicate with these drawers through perforations $q$. The front of the drawers have washers $r$ to make water-tight joints when closed. The drawers are removable through doors in the outside casing B.

Within the washing-tank D is a rotary screen-reel or sieve $d'$, having a perforated hollow axle $d^3$. The hollow axle communicates with pan X by a pipe $d^4$. G is a water-supply pipe. From this issue branches $g$, one of which extends into each pan of the series and terminates near the bottom thereof with a slight curve, as shown. A branch $g'$ also enters tank D. This latter branch is controlled by a cock $g^2$, and the branches $g$ are controlled by cocks $g^3$, one for each branch. A perforated cross-pipe $g^4$ communicates with the water-pipe and extends across above the screen C, said pipe being controlled by a cock $g^5$. A perforated water-pipe $g^6$ lies in the upper end of pan X. H is an air-supply pipe fitted at its lower end with a suitable blower $h$. From this pipe issue branches $h'$, which enter the several pans of the series and terminate near their bottoms, as shown.

From the bottom of the tank D and the several pans issue discharge-pipes $i$, controlled by cocks $i'$, and all joining a common stand-pipe I, the lower end of which enters a receiving-box J.

K are air-relief faucets from the several pans.

Upon top of frame A is a pulverizer L of suitable character. This communicates with the interior of the apparatus and is adapted to discharge its contents upon the screen C. It receives material from the elevator M, the lower end of which communicates with a feed-box $m$.

In the lower portion of the apparatus is mounted a power-shaft N. Upon one end of this is a pulley $n$, from which a belt $n'$ extends to and drives the pulverizer. From another pulley $n^2$ on said shaft extends a belt $n^3$ to a pulley $d^2$ on the shaft of reel $d'$, whereby the latter is driven, and from another pulley $d^5$ on the reel-shaft extends a belt $n^4$ to a pulley $n^5$ on a crank-shaft $n^6$, which is connected by a pitman $n^7$ with the screen C, whereby said screen is shaken. These connections are also on the opposite side of the apparatus. The elevator is driven by a belt O from the pulverizer.

The washing-tank D is preferably made of galvanized iron. The pans are also made of galvanized iron or of silver-plate or porcelain, and all the pans, the tank D, and the receiving-chamber F may be lined with rubber.

Glass doors (represented by P) are placed in main box B to permit observation of the interior, and said box should be so constructed as to afford access to the interior to remove the pans for cleaning.

The use of my apparatus is as follows: Quicksilver is to be placed in tank D and drawers R. Water is supplied through pipe G, cock $g^2$, and branch $g'$ to tank D. It overflows from tank D, through pipe $d$, into pan E, and, thence overflowing in the series of pans, finally issues from discharge $f$ of the receiving-chamber F. The air-relief faucets have been previously opened to permit the air to escape. When the water issues from $f$, it is known that it is at a proper level in all the interior vessels. Now the feed-box $m$ is filled with material and the power is applied. The material is carried up by the elevator and dropped into the pulverizer. From this it is dropped upon screen C, which sifts and distributes it into pan X. From this pan it passes, assisted by water, from pipe $g^6$, through pipe $d^4$, into the hollow perforated axle $d^3$ of reel $d'$. From the axle it is discharged into the reel, and in this it is constantly rolled and agitated and sifted out uniformly into the water in tank D. All the water-cocks $g^3$ are opened, and, the blower being in operation, air is forced into the water in the several pans. The material in tank D is kept agitated by the revolving reel and the concentrates settle and many are caught by the quicksilver. The lighter particles overflow into pan E, and here again the agitation is kept up by the incoming air, and the heavier particles settle, and this continues throughout the series of pans. The tailings which pass off through $f$ can be examined from time to time, and if not satisfactory the operation can be regulated by adjusting the water-cocks of the several vessels either successively or simultaneously, according to the exigencies of the case. At stated intervals the concentrates can be drawn off through the discharge-pipe $i$, cocks $i'$, and stand-pipe I into receiving-box J. During the operation the fine free gold passes down through the perforations $q$ in the bottoms of tank D and of the pans and entering the drawers R is caught by the quicksilver. The amalgam can be reached by removing the drawers.

Having thus described my invention, what I claim as new, and desire to secure by Letters Patent, is—

1. In an ore-concentrator, the combination of the superposed washing-tank to which the material is supplied, the underlying vertical series of pans having cock-controlled discharge-pipes, the alternating side and central overflow-pipes connecting said tank and pan series, and the vertical water-pipe provided with a cock-controlled branch entering said tank and cock-controlled branches entering the pans and terminating near their bottoms, substantially as herein described.

2. In an ore-concentrator, the combination of the superposed washing-tank to which the material is supplied, the underlying vertical series of pans having cock-controlled discharge-pipes, the overflow-pipes connecting said tank and pan series, the vertical water-pipe having cock-controlled branches entering said tank and pans, the air-blower, the air-pipe, and the branches of said air-pipe entering the pans and terminating near their bottoms, substantially as herein described.

3. In an ore-concentrator, the combination of the shaking-screen, the receiving-pan K, the rotating screen-reel with hollow perforated axle, the pipes connecting the pan with the hollow axle, and the washing-tank in which said reel rotates, substantially as herein described.

4. In an ore-concentrator, the combination of the superposed washing-tank, the rotary screen-reel or sieve therein having a perforated hollow axle and material-supply pipe connected with said axle, the underlying vertical series of pans, overflow-pipes connecting said tank and pans, cock-controlled water-supply branches entering said tank and pans, air-supply pipes entering the pans, and a blower to furnish the air, substantially as herein described.

5. In an ore-concentrator, the combination of the washing-tank, the rotary screen-reel or sieve therein having a perforated hollow axle, the supply-pan above, the pipe connecting said pan with the hollow axle, the underlying vertical series of pans, overflow-pipes connecting said tank and pans, cock-controlled water-supply branches entering said tank and pans, air-supply pipes entering the pans, and a blower to furnish the air, substantially as herein described.

6. In an ore-concentrator, the combination of the washing-tank, the rotary screen-reel or sieve therein having a perforated hollow axle, the supply-pan communicating with said axle and having a water-sprinkler, the shaking-screen above the pan, the perforated water-pipe above the screen, the underlying vertical series of pans, overflow-pipes connecting said tank and pans, cock-controlled water-supply branches entering said tank and pans, air-supply pipes entering the pans, and a blower to furnish the air, substantially as herein described.

7. In an ore-concentrator, the combination of the shaking-screen, the pan below, the water-tank with its revolving reel communicating with the pan, the vertical series of pans, the receiving-chamber F, overflow-pipes connecting the tank, pans, and chamber, the cock-controlled discharge of said chamber, the cock-controlled water branches entering the tank and pans, the air-supply pipes entering the pans, and the blower to furnish the air, substantially as herein described.

8. In an ore-concentrator, the combination of the shaking-screen, the water-sprinkler above, the pan below, the water-tank with its revolving reel communicating with the pan, the vertical series of pans, the receiving-chamber F, overflow-pipes connecting the tank, pans, and chamber, the cock-controlled discharge of said chamber, the cock-controlled water branches entering the tank and pans, the air-supply pipes entering the pans, the blower to furnish the air, and the cock-controlled discharge-pipes from the tank and pans, substantially as herein described.

9. In an ore-concentrator, the series of pans, in combination with the alternating central and side overflow-pipes by which said pans communicate, said pipes having a dividing-board and side apertures in their lower ends, substantially as herein described.

10. In an ore-concentrator, the combination of the washing-tank, the series of pans, overflow-pipes connecting said tank and pans, separate cock-controlled water branches entering said tank and pans, air-pipes entering the pans, cock-controlled discharges from tank and pans, and the underlying removable drawers under said tank and pans and with which they communicate through perforations in their bottoms, substantially as herein described.

11. A concentrating apparatus consisting of a frame, a confining box or casing, a shaking-screen in the upper portion of the box, a pulverizer above the screen for supplying it, an elevator for supplying the pulverizer, a supply-pan below the screen, a washing-tank under the pan, having a rotary screen-reel communicating with the pan, a series of pans under the tank, a receiving-chamber under the pans, provided with a cock-controlled discharge, overflow-pipes connecting the tank, pans, and chamber, cock-controlled water branches entering the tank and pans, air-pipes entering the pans, and cock-controlled discharge-pipes for said tank and pans, substantially as described.

In witness whereof I have hereunto set my hand.

PEDRO DE NAPOLES.

Witnesses:
  S. H. NOURSE,
  J. A. BAYLESS.